US012677011B2

(12) United States Patent
Fang et al.

(10) Patent No.: US 12,677,011 B2
(45) Date of Patent: Jul. 7, 2026

(54) LIVE BROADCASTING COMMENT PRESENTATION METHOD AND APPARATUS, AND DEVICE, PROGRAM PRODUCT AND MEDIUM

(71) Applicant: Beijing Zitiao Network Technology Co., Ltd., Beijing (CN)

(72) Inventors: Angxiang Fang, Beijing (CN); Yijie Li, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 74 days.

(21) Appl. No.: 18/718,347

(22) PCT Filed: Dec. 7, 2022

(86) PCT No.: PCT/CN2022/137273
§ 371 (c)(1),
(2) Date: Jun. 10, 2024

(87) PCT Pub. No.: WO2023/104102
PCT Pub. Date: Jun. 15, 2023

(65) Prior Publication Data
US 2025/0056068 A1     Feb. 13, 2025

(30) Foreign Application Priority Data

Dec. 10, 2021     (CN) .......................... 202111510126.X

(51) Int. Cl.
*H04N 21/2187*     (2011.01)
*H04N 21/442*     (2011.01)
(Continued)

(52) U.S. Cl.
CPC ... *H04N 21/2187* (2013.01); *H04N 21/44204* (2013.01); *H04N 21/4728* (2013.01); *H04N 21/4788* (2013.01)

(58) Field of Classification Search
CPC ......... H04N 21/2187; H04N 21/44204; H04N 21/4728; H04N 21/4788; H04N 21/431;
(Continued)

(56) References Cited

U.S. PATENT DOCUMENTS 10,891,030 B1 * 1/2021 Walton .................... G06T 13/80
2013/0260896 A1 * 10/2013 Miura .................... A63F 13/47
463/42

(Continued)

FOREIGN PATENT DOCUMENTS

CN     105554582 A  *  5/2016   ......... H04N 21/4756
CN     105635848 A     6/2016
(Continued)

OTHER PUBLICATIONS

China National Intellectual Property Administration, Office Action and Search Report Issued in Application No. 202111510126.X, Apr. 8, 2023, 14 pages.
(Continued)

*Primary Examiner* — Cynthia M Fogg
(74) *Attorney, Agent, or Firm* — Alleman Hall LLP

(57)     ABSTRACT

The embodiments of the present disclosure relate to a live broadcasting comment presentation method and apparatus, and a device and a medium. The method is applied to a viewer end, and comprises: playing a live broadcasting video in a live broadcasting page, and presenting comment content of the live broadcasting video in a first area of the live broadcasting page; when the live broadcasting video meets a preset trigger condition, converting target comment content in the comment content into a target bullet curtain; and presenting the target bullet curtain in a rolling manner in a second area of the live broadcasting page, and presenting a bullet curtain control.

17 Claims, 7 Drawing Sheets

(51) Int. Cl.
H04N 21/4728 (2011.01)
H04N 21/4788 (2011.01)

(58) Field of Classification Search
CPC ........... H04N 21/4312; H04N 21/4316; H04N
21/475; H04N 21/488; H04N 21/4882;
H04N 21/4756; H04N 21/4884; H04N
21/23418; H04N 23/631; H04N 19/17
USPC .......................................................... 725/116
See application file for complete search history.

(56) References Cited

U.S. PATENT DOCUMENTS

| | | | | |
|---|---|---|---|---|
| 2019/0149731 A1* | 5/2019 | Blazer | ..................... | G06F 3/011 |
| | | | | 348/39 |
| 2020/0404380 A1* | 12/2020 | Tan | ..................... | H04N 21/4788 |
| 2022/0046291 A1* | 2/2022 | Jiang | ................. | H04N 21/4886 |
| 2022/0408160 A1* | 12/2022 | Wu | ..................... | H04N 21/4884 |
| 2023/0162451 A1* | 5/2023 | Wang | ..................... | A63F 13/86 |
| | | | | 345/633 |
| 2023/0254524 A1* | 8/2023 | Hosoda | ................. | G06F 3/0481 |
| | | | | 725/116 |
| 2023/0328330 A1* | 10/2023 | He | ..................... | H04N 21/2743 |
| | | | | 725/37 |

| | | | | |
|---|---|---|---|---|
| 2023/0336792 A1* | 10/2023 | Zhen | ................... | H04N 21/4316 |
| 2024/0012554 A1* | 1/2024 | Fang | ..................... | G06F 3/0485 |
| 2024/0292052 A1* | 8/2024 | Zhang | ................. | H04N 21/478 |

FOREIGN PATENT DOCUMENTS

| | | |
|---|---|---|
| CN | 105959816 A | 9/2016 |
| CN | 106055707 A | 10/2016 |
| CN | 107229727 A | 10/2017 |
| CN | 104754396 B | 2/2018 |
| CN | 109286835 A | 1/2019 |
| CN | 109618213 A | 4/2019 |
| CN | 111246227 A | 6/2020 |
| CN | 112188263 A | 1/2021 |
| CN | 112423110 A | 2/2021 |
| CN | 113055700 A | 6/2021 |
| CN | 114205635 A | 3/2022 |
| JP | 2020127211 A | 8/2020 |
| JP | 6850927 B1 | 3/2021 |

OTHER PUBLICATIONS

ISA China National Intellectual Property Administration, International Search Report and Written Opinion Issued in Application No. PCT/CN2022/137273, Feb. 20, 2023, WIPO, 17 pages.

* cited by examiner

101

Playing a livestream video in a livestream page and presenting first interaction information of the livestream video in a first region of the livestream page

102

In response to satisfying a preset trigger condition, converting a target interaction information included in the first interaction information into second interaction information

LIVE BROADCASTING COMMENT PRESENTATION METHOD AND APPARATUS, AND DEVICE, PROGRAM PRODUCT AND MEDIUM

CROSS-REFERENCE TO RELATED APPLICATIONS

The present application is a national phase application of International Application No. PCT/CN2022/137273, filed on Dec. 7, 2022, which claims priority to Chinese Application No. 202111510126.X filed on Dec. 10, 2021, the disclosure of both is incorporated by reference herein in its entirety.

TECHNICAL FIELD

The present disclosure relates to the field of livestream technologies, and in particular to a livestream comment presentation method and apparatus, a device, a program product, and a medium.

BACKGROUND

With the continuous development of livestream technologies, livestream viewing becomes an increasingly popular way of entertainment in people's life.

In a livestream application, a user can send comments to interact with a streamer. The comments in a livestream room are usually limited to be presented in a small area of a livestream picture at present. The comment style is monotonous, and the presentation effect is poor, which thus results in a poor comment atmosphere perceived by the user.

SUMMARY

In order to solve the above technical problem, the present disclosure provides a livestream comment presentation method and apparatus, a device, a program product, and a medium.

An embodiment of the present disclosure provides a comment presentation method, which is applied to a first client, including:

playing a livestream video in a livestream page and presenting first interaction information of the livestream video in a first region of the livestream page;

in response to satisfying a preset trigger condition, converting a target interaction information included in the first interaction information into second interaction information.

An embodiment of the present disclosure provides a comment presentation method, which is applied to a second client, including:

determining region information of a target object region for livestreaming; and sending the region information to a first client, so that the first client ceases display of second interaction information over the target object region in the livestream page of the livestream video according to the region information;

wherein, the first interaction information are presented in a first region of the livestream page, the second interaction information is presented in a moving manner in a second region of the livestream page, the target object region is located in the second region.

An embodiment of the present disclosure further provides a livestream comment presentation apparatus, which is provided at a first client, including:

a first presenting module for playing a livestream video in a livestream page and presenting first interaction information of the livestream video in a first region of the livestream page;

a comment module for converting, when satisfying a preset trigger condition, a target interaction information included in the first interaction information into a second interaction information.

An embodiment of the present disclosure further provides a comment presentation apparatus, which is provided at a second client, including:

a segmentation module for performing region segmentation on a livestream video being livestreamed, determining region information of a target object region; and a sending module for sending the region information to a first client, so that the first client ceases display of second interaction information over the target object region in a livestream page of the livestream video according to the region information;

wherein the first interaction information are presented in a first region of the livestream page, the second interaction information is presented in a moving manner in a second region of the livestream page, the target object region is located in the second region.

An embodiment of the present disclosure further provides an electronic device, the electronic device including: a processor; a memory for storing executable instructions of the processor; wherein the processor is used for reading the executable instructions from the memory and executing the instructions to implement the comment presentation method provided by the embodiment of the present disclosure.

An embodiment of the present disclosure further provides a computer program product comprising computer program/ instructions, wherein the computer program/instructions, when being executed by a processor, implements the comment presentation method provided by the embodiment of the present disclosure.

An embodiment of the present disclosure further provides a computer readable storage medium storing a computer program, which is used for executing the comment presentation method provided by the embodiment of the present disclosure.

An embodiment of the present disclosure further provides a computer program comprising instructions which, when being executed by a processor, cause the processor to execute the comment presentation method provided by the embodiment of the present disclosure.

BRIEF DESCRIPTION OF THE DRAWINGS

In combination with the accompanying drawings and with reference to the following particular implementations, the above and other features, advantages, and aspects of various embodiments of the present disclosure will become more apparent. Throughout the accompanying drawings, identical or similar reference numbers present identical or similar elements. It should be understood that the accompanying drawings are schematic and that components and elements are not necessarily drawn to scale.

DETAILED DESCRIPTION

Figure 1:
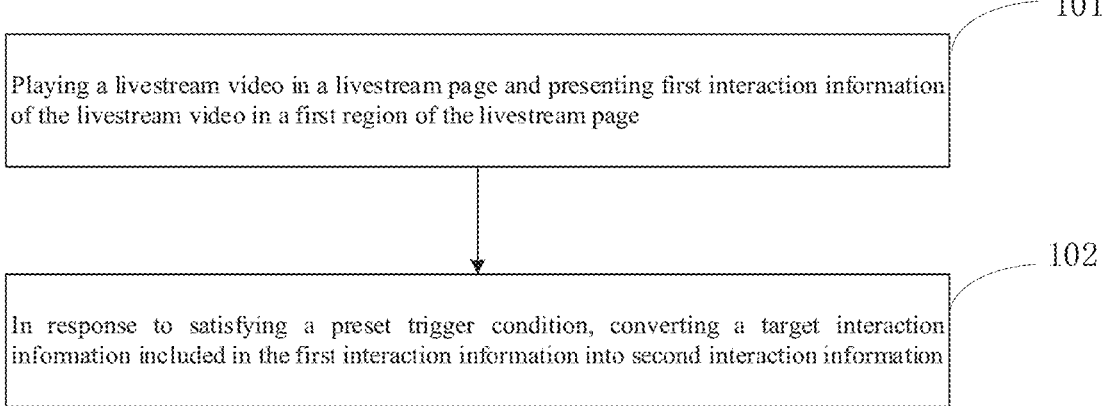
FIG. 1 is a schematic flowchart of a livestream comment presentation method provided by an embodiment of the present disclosure.

Embodiments of the present disclosure will be described in more detail below with reference to the accompanying drawings. While certain embodiments of the present disclosure are shown in the accompanying drawings, it should be understood that the present disclosure can be implemented in various forms and should not be construed as limited to the embodiments set forth herein, but rather are provided for a more thorough and complete understanding of the present disclosure. It should be understood that the accompanying drawings and the embodiments of the present disclosure are for illustration purposes only and are not intended to limit the protection scope of the present disclosure.

It should be understood that the various steps recited in method implementations of the present disclosure can be executed in a different order, and/or executed in parallel. Moreover, method implementations may include additional steps and/or omit executing the illustrated steps. The scope of the present disclosure is not limited in this respect.

The term "including" and variations thereof as used herein are open-ended, i.e., "including but not limited to". The term "based on" is "based at least in part on". The term "one embodiment" represents "at least one embodiment"; the term "another embodiment" represents "at least one additional embodiment"; the term "some embodiments" represents "at least some embodiments". Relevant definitions for other terms will be given in the following description.

It should be noted that the terms "first", "second", and other concepts mentioned in the present disclosure are only used for distinguishing different apparatuses, modules or units, and are not used for limiting the order or interdependence of the functions executed by the apparatuses, modules or units.

It should be noted that references to "one" or "more" mentioned in the present disclosure are illustrative rather than limiting, and that those skilled in the art should understand that they should be understood as "one or more" unless the context clearly indicates otherwise.

The names of messages or information exchanged between apparatuses in the implementations of the present disclosure are for illustrative purposes only, and are not intended to limit the scope of these messages or information.

Comments of a livestream room are usually limited to be presented in a small area of a livestream picture, for example, the comments can be presented only in a public screen region or through a privileged bullet screen comment in a vertical screen stream livestream state (including a PK state), a horizontal screen stream livestream non-full screen and other scenarios, so that presentation of a target object picture will be obstructed during the presentation, and the presentation effect is poor; when the comments of the livestream room are only limited in the public screen region, the presentation style is monotonous, and a comment interaction mode which promotes the comment atmosphere in the livestream room and faces the public viewing users is absent; and the privileged bullet screen comment is a comment interaction mode facing a small group of paying users, the presentation quantity is small, and the influence on the viewing atmosphere is small. During the livestream comment presentation in the related art, there is a problem that the comment style is monotonous and the presentation effect is poor, which thus results in a problem of poor comment atmosphere perceived by a user. In order to solve the above problems, an embodiment of the present disclosure provides a livestream comment presentation method, which is introduced below in combination with specific embodiments.

Compared with the related art, the technical solution provided by the embodiment of the present disclosure has the following advantages: according to the livestream comment presentation solution provided by the embodiment of the present disclosure, a viewer end can play a livestream video in a livestream page and present comment contents of the livestream video in a first region of the livestream page; when the livestream video satisfies a preset trigger condition, convert a target comment content in the comment contents into a target bullet screen comment; and present the target bullet screen comment in a rolling manner in a second region of the livestream page, and present a bullet screen comment control. By adopting the above solution, on the basis of presenting a livestream comment content on a livestream page, a comment content can be converted into a bullet screen comment and can be presented in a rolling manner in a picture region of the livestream page in form of a bullet screen comment when a trigger condition is met, and a bullet screen comment control can also be presented, which increases the presentation region and the presentation quantity of the comment contents in the livestream pictures, facilitates enhancement of the comment atmosphere, alerts the user that a portion of the current comment contents is presented in form of a bullet screen comment by presenting the bullet screen comment control, strengthens the presentation effect of the comment content, and further improves the livestream experience of the user.

FIG. 1 is a schematic flowchart of a comment presentation method provided by an embodiment of the present disclosure. The method can be executed by a comment presentation apparatus, wherein the apparatus can be implemented by software and/or hardware, and can generally be integrated into an electronic device. As shown in FIG. 1, the method is applied to a first client, including:

Step 101, playing a livestream video in a livestream page and presenting first interaction information of the livestream video in a first region of the livestream page.

The first client is a client at which viewer users view a livestream and is also called viewer end. The livestream page can be a page at the viewer end for playing a livestream video of a livestream room and presenting related information of the livestream room. The first region can be a region set for the comment content in the livestream page, in which at least part of a livestream picture of the livestream video is presented. Specifically, the first region can be a bottom region of the livestream picture, such as a public screen region.

In the embodiment of the present disclosure, the first interaction information can be first dynamic comments that move in a first direction in the first region, so that the first interaction information is also referred to as comment contents.

In the embodiment of the present disclosure, after receiving a trigger operation for livestream viewing of a user, the viewer end can acquire a livestream video and comment contents of a livestream room corresponding to the trigger operation for livestream viewing from a server, present a livestream page, and play the livestream video in the livestream page and present the comment contents in an image layer over a first region of the livestream page, that is, an image layer where the comment content is located is superposed on a playing image layer of the livestream video, and obstruct a part of the livestream picture presented in the first region during presentation.

Figure 2:
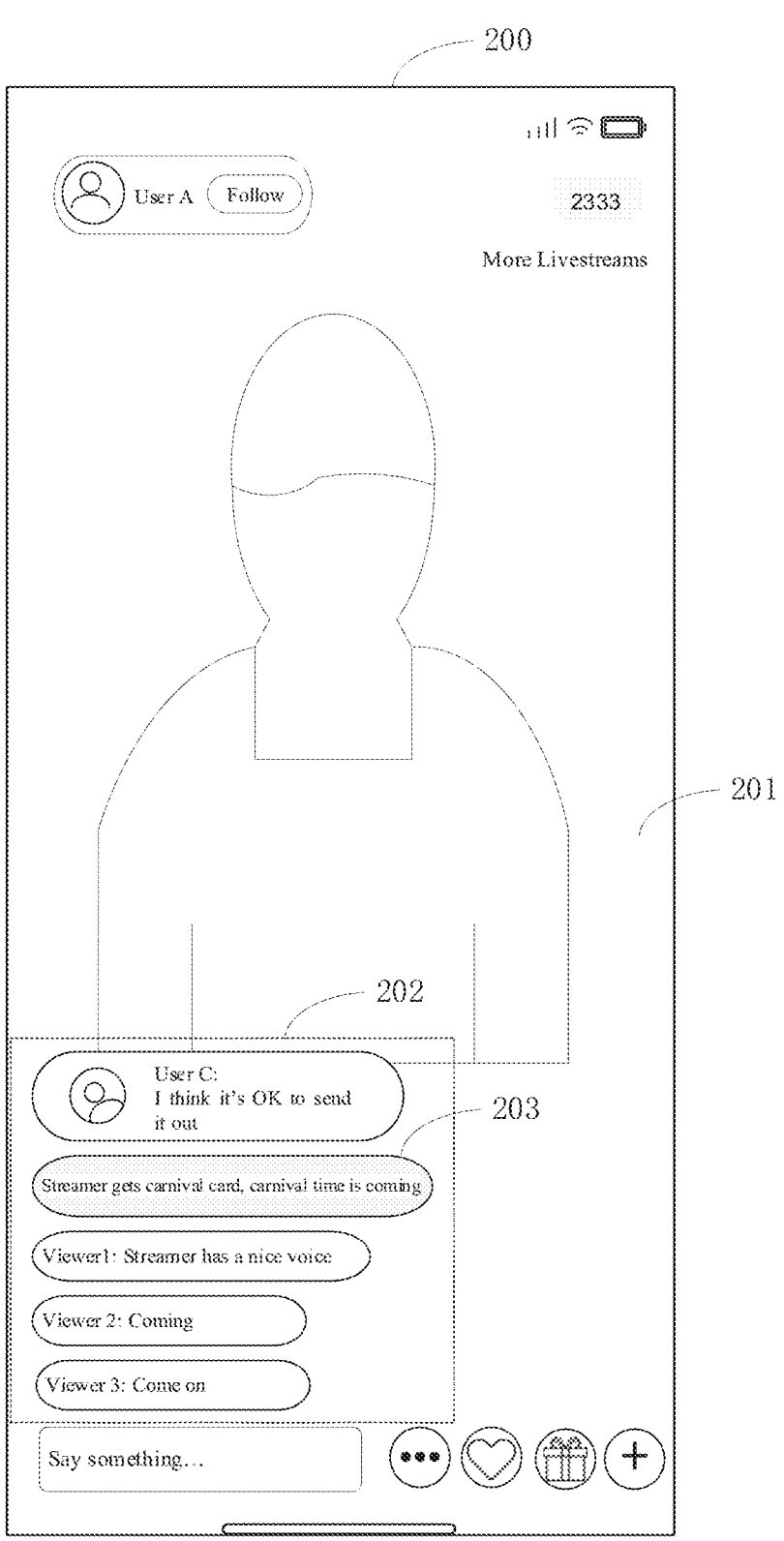
FIG. 2 is a schematic diagram of a livestream page provided by an embodiment of the present disclosure.

Illustratively, FIG. 2 is a schematic diagram of a livestream page provided by an embodiment of the present disclosure. As shown in FIG. 2, a livestream page 200 is shown. In the livestream page 200, a livestream video 201 is being played, and comment contents are presented in a first region 202 of the livestream page 200. The comment contents obstruct a part of a livestream picture and is limited to a small area. In addition, a comment input box can also be presented in the first region so as to facilitate participation of users in comment interaction.

Step 102, when satisfying a preset trigger condition, converting a target interaction information included in the first interaction information into second interaction information.

The preset trigger condition can be understood as a judgment condition of a trigger timing for presenting the comment content in form of a bullet screen comment, that is, a trigger judgment condition of a special presentation mode of the comment content in the embodiment of the present disclosure. The second interaction information can be second dynamic comments that move in a second direction that is different from the first direction. For example, the second dynamic comments can be obtained by applying a comment template to the comment content. In an embodiment, the second dynamic comments can be bullet screen comments, which are a kind of dynamic comments, so that the second interaction information can be referred to as target bullet screen comments. The target interaction information is also referred to as target comment content.

In the embodiment of the present disclosure, satisfying a preset trigger condition includes: when a streamer of a livestream room corresponding to the livestream video obtains a preset resource, or the livestream video is played to a preset time point, or a viewer number of the livestream room reaches a first preset viewer number threshold, or a trending comment is generated in the livestream room, determining that the livestream video satisfies the preset trigger condition; wherein, the target comment content is the trending comment in the comment contents, and the trending comment is a comment content with a number of presentations or interactions reaching a preset number threshold. In addition, the livestream video satisfying a preset trigger condition can also be that a streamer or a viewer triggers a preset comment key.

The preset resource can be an activity carnival card obtained by the streamer of the livestream room, and the activity carnival card can be understood as a right capable of starting a carnival time. The preset comment key can be a preset function key for starting a special presentation mode of the comment content, and the trigger operation can be single click, double click, long press and the like, which is not limited specifically. The preset time point can be a fixed time point preset by the server, for example, can be set according to the requirement of a special activity, a livestream room, or other factors. The first preset viewer number threshold can be set according to an actual situation. The trending comment can be a comment content set according to interaction trending, and specifically can be a comment content with a number of presentations or interactions (for example, like, reply, etc.) reaching a preset number threshold, and the preset number threshold can be set according to an actual situation. For example, if the preset number threshold is 10 and the number of identical comment contents "excellent", which are sent in the livestream room, reaches 11, then it is determined that "excellent" is a trending comment, or if the number of likes for the comment "excellent" reaches 11, then it is determined that "excellent" is a trending comment.

Specifically, after a livestream video is played in a livestream page, when a streamer of a livestream room corresponding to the livestream video obtains a preset resource, it can be determined that the livestream video satisfies a preset trigger condition; or when the livestream video has been played till the system time reaches a preset time point, that is, the current time is the preset time point, it can be determined that the livestream video satisfies the preset trigger condition; or if the viewer number of the livestream room reaches a first preset viewer number threshold, then it can be determined that the livestream video satisfies the preset trigger condition; or when a trending comment is generated in the livestream room, it can be determined that the livestream video satisfies the preset trigger condition.

Figure 3:
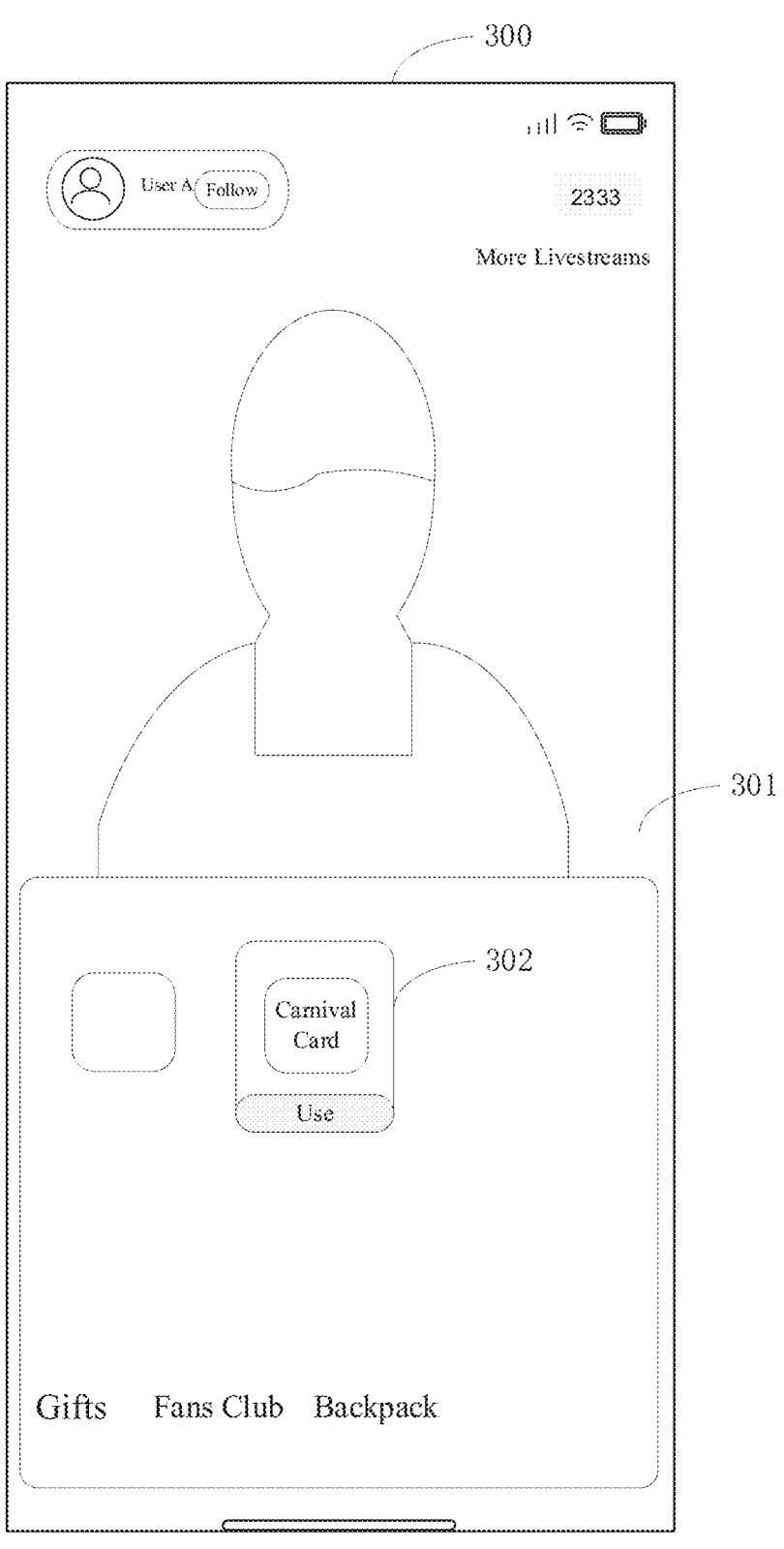
FIG. 3 is a schematic diagram of another livestream page provided by an embodiment of the present disclosure.

Illustratively, FIG. 3 is a schematic diagram of another livestream page provided by an embodiment of the present disclosure. As shown in FIG. 3, a livestream page 300 is shown. In the livestream page 300, a livestream video 301 is being played, and a preset comment key 302 is also presented. The preset comment key 302 can be a prop key named "carnival card", and when a viewer triggers the preset comment key 302, then it can be determined that the streamer of the livestream room obtains a resource "carnival card", that is, it is determined that the livestream video 301 satisfies a preset trigger condition.

In the embodiment of the present disclosure, the converting a target comment content in the comment contents into a target bullet screen comment can include: converting a target comment content in the comment contents into a target bullet screen comment on the basis of a pre-acquired bullet screen comment template which is used for defining a bullet screen comment style and/or bullet screen comment track of the target bullet screen comment.

The target comment content is a trending comment in the comment contents, and the trending comment is a comment content with a number of presentation or interaction reaching a preset number threshold. Or, the target comment content can also be a comment content from a buffer queue, that is, the comment contents are fully determined as the target comment contents without being screened.

The bullet screen comment template can be used for defining a bullet screen comment style and/or a bullet screen comment track of a target bullet screen comment, and is a template preset in the server, and the bullet screen comment template can be dynamically set and adjusted based on service requirements. The bullet screen comment style can include various style data for controlling presentation styles of the target bullet screen comment. The bullet screen comment style in the embodiment of the present disclosure can include at least one of profile picture size, comment font size, comment color code, bullet screen comment frame cutting, bullet screen comment frame probability and comment bonus scene. The bullet screen comment frame cutting can be formed by splicing a left portion, a middle portion and a right portion; the bullet screen comment frame probability is used for specifying the probabilities of occurrence of the bullet screen comment frame cutting and the comment color code in a specified bullet screen comment style, and the sum of the probabilities of all style data of each bullet screen comment template is 1; the comment bonus scene can be a preset special image for promoting comment atmosphere, and can be specifically set according to an actual situation. The bullet screen comment track can include at least one of a rotation angle of the bullet screen comment, a speed for rolling presentation of the bullet screen comment, and a track area. The rotation angle of the bullet screen comment can be used for controlling a rotation angle of the target bullet screen comment in the livestream page when the target bullet screen comment is presented and can be set to be any angle between –90 degrees and +90 degrees; the speed for rolling presentation of the bullet screen comment can be used for controlling a screen rolling speed of the target bullet screen comment during presentation; the track area can be used for controlling a presentation area of the target bullet screen comment.

In some embodiments, before the above Step 101 or Step 102, the comment presentation method can further include: acquiring a template corresponding to the livestream room of the livestream video from the server, wherein different livestream rooms correspond to different templates. In an embodiment, the template can be a bullet screen template.

Since the bullet screen comment template can be flexibly set according to service requirements, the server can set corresponding bullet screen comment templates with respect to different livestream rooms. The viewer end can acquire the bullet screen comment template corresponding to the livestream room which is livestreaming at present from the server, so as to convert the comment content into the target bullet screen comment based on the bullet screen comment template, which is helpful for the target bullet screen to more comply with the personalized style of the livestream room during the follow-up presentation and to be presented in a more fit form.

In an embodiment of the present disclosure, the method further comprises presenting the second interaction information in a moving manner in a second region of the livestream page.

In an embodiment of the present disclosure, the second interaction information is presented in a rolling manner in the second region of the livestream page.

In an embodiment of the present disclosure, the method comprises presenting a comment control for the second interaction information, e.g., a bullet screen comment control.

The present disclosure converts the target interaction information in the first region into second interaction information and displays the second interaction information in the second region, which is helpful for users to participate in livestream interaction, improves user experience, facilitates the user's control of displaying of the second interaction information by presenting a comment control for the second interaction information, and enriches the interaction mode in the livestream room.

The second region is larger than the first region, that is, the second region can be a region of the livestream page that is much larger than the above first region. For example, the second region can be a central region of the livestream page or a region to which a line of sight of a user is directed, which can be visually seen by the user, and the second region is different from the first region. At least part of a livestream picture of the livestream video is presented in the second region, either.

In the embodiment of the present disclosure, the presenting the target bullet screen comment in a rolling manner in a second region of the livestream page can include: ceasing display of (e.g., hiding) the target bullet screen comment over a target object region in the second region while presenting the target bullet screen comment in a rolling manner in the second region of the livestream page. For example, the target bullet screen comment is presented in a rolling manner inside the second region and outside the target object region, that is, the target bullet screen comment rolls in the second region. Presentation of the target bullet screen comment is cancelled when passing through the target object region and restored when leaving the target object region. The target bullet screen comment is displayed in a rolling manner along a second direction in the second region, and the second direction is different from the first direction.

The target object region can be understood as a presentation region where a target object is located in a process of playing a livestream video, and the target object can be a person, an animal, a plant, or other objects, which is not limited specifically. In the embodiment of the present disclosure, after the viewer end converts the comment content into the target bullet screen comment on the basis of the pre-acquired bullet screen comment template, the target bullet screen comment can be hidden from being presented at a position in the image layer over the target object region while the target bullet screen comment is presented in a rolling manner in the image layer over the second region of the livestream page, so that the target bullet screen comment will not obstruct the target object region when passing through the target object region of the livestream picture, which avoids the influence on the viewing experience of viewer users.

In one implementation, the presenting the target bullet screen comment in a rolling manner over the second region of the livestream page and hiding the target bullet screen comment over the target object region in the second region can include: acquiring region information of a target object region sent by a streamer end of a livestream video; mapping a mask in the image layer over the second region according to the region information to serve as a target object region; and presenting the target bullet screen comment in a rolling manner in a region other than the target object region in the image layer over the second region.

The region information of the target object region can be position information of a region corresponding to a target object in each frame of a livestream picture included in the livestream video, can be obtained by performing region segmentation for the livestream video by a streamer end and then sent to the viewer end. Since the livestream video is a streaming media file including a livestream picture with multiple frames flowing, the region information of the target object region can be different for each frame of the livestream picture.

Specifically, the viewer end can acquire the region information of the target object region sent by the streamer end through the server. The livestream video can be played in a playing image layer in the livestream page. An image layer can be further set over the image layer where the livestream video is located, and the image layer can be set over the second region and correspond to the second region for presenting a target bullet screen comment in a rolling manner. The region information of the target object region corresponds to the position where the target object is located in the livestream video. A corresponding region can be mapped in the image layer over the playing image layer according to the region information, and a mask is set in the mapped region as a target object region, and then a target bullet screen comment can be presented in a rolling manner in a region other than the above target object region in the image layer over the second region. The target bullet screen comment in the target object region is hidden, so that the livestream picture of the target object region is not obstructed and influenced while the target bullet screen comment is presented in a rolling manner.

The above mask can have a function for hiding a displayed content in a designated region, and the mask can be set in the designated region as a shielding region. The target object region in the embodiment of the present disclosure is a shielding region, and the specific hiding mode is not limited. For example, the displayed content can be set to be transparent or directly shielded so that it is not displayed. The displayed content is the above target bullet screen comment. A shape of the mask can correspond to the target object region and can be in format of vector graphics.

In another implementation, the presenting the target bullet screen comment in a rolling manner over the second region of the livestream page and hiding the target bullet screen comment over the target object region in the second region includes: when the livestream video satisfies a preset trigger condition but a first duration, for which the region information of the target object region has not been acquired, reaches a first preset time length, firstly presenting the target bullet screen comment in a rolling manner over the second region; and after the region information of the target object region is acquired, hiding the target bullet screen comment over the target object region in the second region according to the region information.

The first preset time length can be a time threshold set for the above first duration, for example, the first preset time length can be 5 seconds. After the viewer end determines that the livestream video satisfies a preset trigger condition and converts the comment content into a target bullet screen comment on the basis of a pre-acquired bullet screen comment template, if the region information of a target object region has not been acquired from the streamer end due to a network factor or other factors and the first duration of the current state reaches a first preset time length, then the target bullet screen comment can be presented in a rolling manner in an image layer over the second region at the moment, and then the target bullet screen comment in the image layer over the target object region in the second region can be hidden according to the region information after the region information of the target object region is acquired. When the region information of the target object region is not acquired, the target bullet screen comment is presented in a rolling manner in the target object region without being hidden at the moment, which avoids poor experience caused by overlong waiting of a viewer user.

Figure 4:
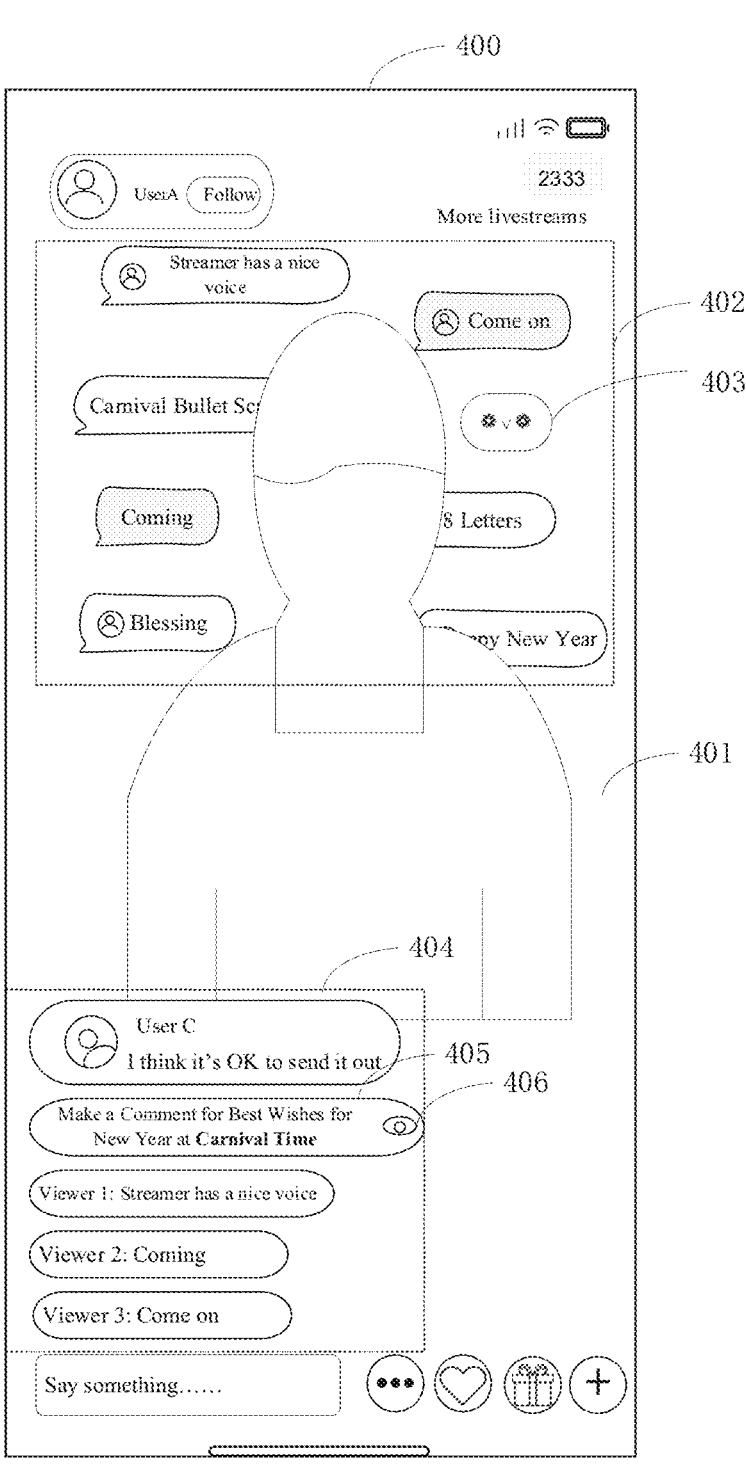
FIG. 4 is a schematic diagram of a further livestream page provided by the embodiment of the present disclosure.

Illustratively, FIG. 4 is a schematic diagram of a further livestream page provided by the embodiment of the present disclosure. As shown in FIG. 4, a livestream page 400 is presented. In the livestream page 400, a livestream video 401 is being played, and a first region 404 and a second region 402 are presented. A part of a livestream picture of the livestream video 401 is presented in both of the first region 404 and the second region 402, comment contents are presented in the first region 404, and comment contents are presented in form of a bullet screen comment in the second region 402, that is, a target bullet screen comment obtained by converting the comment content is presented in a rolling manner. For example, beside a streamer in the figure are presented a plurality of bullet screen comments as follows: the "Streamer has a nice voice", "come on", and etc., as well as a comment bonus image 403 in the figure, which is a smiling face (just an example). Optionally, a profile picture and a comment can be displayed for the comment content of the current user in the target bullet screen comment, and only a comment can be displayed for the comment content of other users. It is understood that the bullet screen comment style and the bullet screen comment track of the target bullet screen comment presented in FIG. 4 are only examples, not limitations, and can be varied following the flexible configuration of the bullet screen comment template.

According to the livestream comment presentation solution provided by the embodiment of the present disclosure, a viewer end can play a livestream video in a livestream page and present comment contents of the livestream video in a first region of the livestream page; when the livestream video satisfies a preset trigger condition, convert a target comment content in the comment contents into a target bullet screen comment; and present the target bullet screen comment in a rolling manner in a second region of the livestream page, and present a bullet screen comment control, wherein, at least part of a livestream picture of the livestream video is presented in the second region, either. By adopting the above solution, on the basis of presenting livestream comment contents on a livestream page, the comment content can be converted into a bullet screen comment and can be presented in a rolling manner in form of a bullet screen comment in a picture region of the livestream page when a trigger condition is met, and a bullet screen comment control can also be presented. It increases the presentation region and the presentation quantity of the comment contents in the livestream picture, facilitates enhancement of the comment atmosphere, alerts the user that a portion of the current comment contents is presented in form of a bullet screen comment by presenting the bullet screen comment control, strengthens the presentation effect of the comment contents, and further improves the livestream experience of the user. In addition, the object region in the video will not be obstructed when the bullet screen comment is presented, which avoids the influence on the user's viewing of the livestream, and guarantees the livestream viewing experience; moreover, the bullet screen comment template can be configured in a flexible way, so that the comment contents have various styles when presented in form of a bullet screen comment, which strengthens the presentation effect of the comment contents, and further improves the livestream experience of the user.

In some embodiments, the comment presentation method can further include: when a second duration for presentation of the target bullet screen comment in a rolling manner reaches a second preset time length, stopping presentation of the target bullet screen comment.

The second duration can be a duration for presentation of the target bullet screen comment, and the second preset time length can be a time threshold set by the server for the second duration. The second preset time length is larger than the above first preset time length, for example, the second preset time length can be 10 seconds. Optionally, if region information of the target object region is not acquired when the target bullet screen comment starts to be presented in a rolling manner, then a start time of the second duration is the time when the region information of the target object region is acquired; and if the region information of the target object region is acquired when the target bullet screen comment starts to be presented in a rolling manner, then the start time of the second duration is the time when the livestream video satisfies the preset trigger condition. Not acquiring the region information of the target object region includes an instance of receiving a hiding off instruction sent by the streamer end. The hiding off instruction can be sent when it is determined that the streamer end does not satisfy a segmentation condition, that is, the streamer end does not perform segmentation of the target object region and bullet screen comment hiding.

Specifically, after the viewer end presents the target bullet screen comment in a rolling manner over the second region of the livestream page and hides the target bullet screen comment over the target object region in the second region, a presentation time length of the target bullet screen comment, that is, a second duration, can be recorded. When the second duration reaches a second preset time length, the presentation of the target bullet screen comment can be stopped. The present application is not limited to this, and the second duration can be set according to other conditions to stop the presentation when the corresponding condition is met. Alternatively, the presentation can be stopped according to a user operation.

In the above solution, there is provided a fixed presentation time length when the comment content is presented in form of a bullet screen comment, and when the fixed presentation time length is reached, the presentation can be stopped with no need to be switched off by the user, which can not only promote livestream comment atmosphere but also avoid the influence of long-time presentation on the user's livestream experience.

In some embodiments, after the livestream video satisfies the preset trigger condition, the comment presentation method can further include: presenting a preset alert message on the livestream page.

The preset alert message can be a message for alerting that a user is about to enter a special scenario where the comment content is presented in form of a bullet screen comment, and the preset alert message can be set by text or picture, which is not limited specifically. Optionally, when the presentation time length of the preset alert message reaches a third preset time length, the presentation can be switched off, and the third preset time length can be set according to an actual situation, for example, the third preset time length can be set to 2 seconds, 3 seconds, or 5 seconds.

Illustratively, with reference to FIG. 2, after a livestream video 201 satisfies a preset trigger condition, a preset alert message 203 can be presented in a livestream page 200. In the preset alert message 203 in the figure, an alert text "Streamer gets a carnival card, and a carnival time is coming", where the "carnival card" is a prop name corresponding to a preset comment key 302 in FIG. 3, and the "carnival time" is a scenario where the target bullet screen comment is presented in FIG. 4.

By setting the preset alert message, the user is enabled to have a certain expectation for entering a special scenario where the comment contents are presented in form of a bullet screen comment, and have a better experience effect.

In some embodiments, the comment presentation method can further include: receiving a trigger operation of a user on the bullet screen comment control, displaying or hiding the target bullet screen comment presented in a rolling manner over the second region, wherein the bullet screen comment control further includes a presentation alert message which is used as an alert of the presentation of the target bullet screen comment.

The bullet screen comment control can be a function control for controlling the hiding or displaying of the target bullet screen comment. The viewer end can present a bullet screen comment control in the livestream page while presenting the target bullet screen comment in a rolling manner in the second region of the livestream page, and, after receiving a trigger operation of the user on the bullet screen comment control, hide the target bullet screen comment if it is being displayed, and display the target bullet screen comment if it is being hidden. Moreover, the bullet screen comment control can also include a presentation alert message for alerting a user that the comment contents are being presented in a rolling manner in form of a bullet screen comment in a current livestream page.

Illustratively, with reference to FIG. 4, a bullet screen comment control 405 can be presented in a livestream page 400 in the figure. When a user triggers the bullet screen comment control 405, hiding or displaying of a target bullet screen comment presented in a second region 402 can be realized. Optionally, a specific trigger mode can be directly triggering the bullet screen comment control 405, or setting an eye-shaped icon button 406 in the bullet screen comment control 405, or triggering the icon button 406. Also, a presentation alert message for alerting the user to a comment status at the moment can be presented in the bullet screen comment control 405, and the presentation alert message can be set according to an actual request, as "Make a Comment for Best Wishes for a New Year at a Carnival Time" in the figure, which is only an example.

In the above solution, through the setting of the bullet screen comment control, the dynamic control for hiding or displaying of the target bullet screen comment, and the alert of comment status for the user can be realized, which better complies with the personalized requirements of the user.

Figure 5:
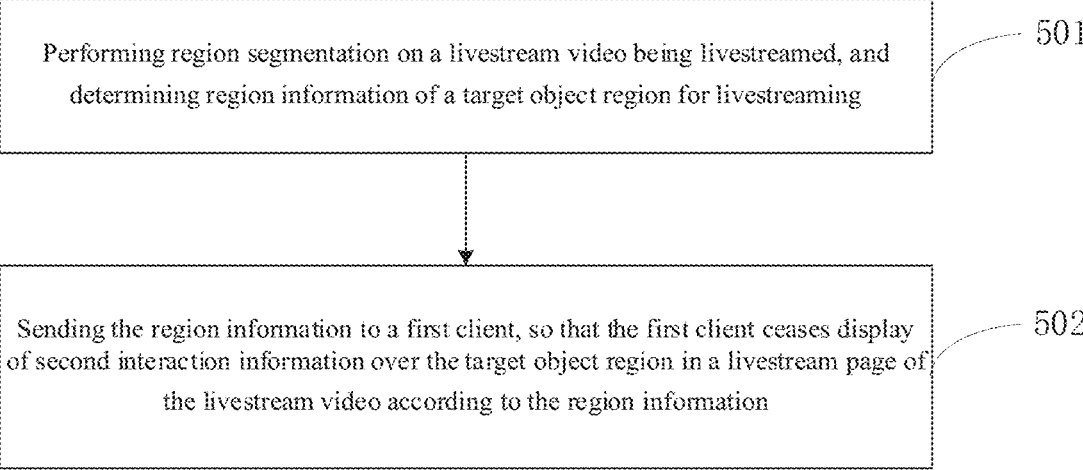
FIG. 5 is a schematic flowchart of another livestream comment presentation method provided by an embodiment of the present disclosure.

FIG. 5 is a schematic flowchart of another comment presentation method provided by an embodiment of the present disclosure. The method can be executed by a comment presentation apparatus, wherein the apparatus can be implemented by software and/or hardware, and can generally be integrated into an electronic device. As shown in FIG. 5, the method, which is applied to a second client, includes:

Step 501, performing region segmentation on a livestream video being livestreamed, and determining region information of a target object region for livestreaming.

The second client can be a client of the streamer, i.e. streamer end. Specifically, in the livestreaming process of the streamer, the streamer end can perform region segmentation on each frame of a livestream picture in the livestream video and determine the region information of the target object region where the streamer is located. Since the livestream video is a streaming media file and includes a livestream picture with multiple frames flowing, the region information of the target object region can differ for each frame of the livestream picture. The region information of the target object region can be position information of a region corresponding to the target object in each frame of the livestream picture included in the livestream video.

In the embodiment of the present disclosure, before the above Step 501, the comment presentation method can further include: judging whether the streamer end satisfies a segmentation condition; the performing region segmentation on a livestream video being livestreamed and determining region information of a target object region can include: when it is determined that the streamer end satisfies the segmentation condition, performing region segmentation on a livestream video being livestreamed and determining region information of a target object region.

The segmentation condition can be a condition for judging whether the streamer end has the capability of performing region segmentation on the livestream video. When it is determined that the streamer end satisfies the segmentation condition, region segmentation can be performed on the livestream video to determine the region information of the target object region.

Optionally, the judging whether the streamer end satisfies a segmentation condition can include: acquiring device grading information from a server; determining a target grade of the streamer end according to the device grading information and performance information of the streamer end; and judging whether the streamer end satisfies the segmentation condition according to the target grade.

The device grading information can be preset by the server for hardware information such as performance and models of different terminal devices. The device grading information can include correspondence between performance information and grades of a plurality of devices preset by the server, that is, different performance information of the terminal devices correspond to different grades. The grades in the embodiment of the present disclosure can include a first grade, a second grade, and a third grade, wherein the performance corresponding to the first grade is higher than the performance corresponding to the second grade, and the performance corresponding to the second grade is higher than the performance corresponding to the third grade. After the streamer end acquires the device grading information sent by the server, the device grading information can be searched according to the performance information of the streamer end to determine a corresponding target grade, and then whether the streamer end satisfies the segmentation condition can be judged according to the target grade.

Optionally, the judging whether the streamer end satisfies the segmentation condition according to the target grade can include: when the target grade is a second grade and the livestream video satisfies the preset trigger condition, determining that the streamer end satisfies the segmentation condition. Optionally, the judging whether the streamer end satisfies the segmentation condition according to the target grade can include: when the target grade is the first grade, acquiring the viewer number of a livestream room corresponding to the livestream video; when the viewer number is smaller than a second preset viewer number threshold value and the livestream video satisfies a preset trigger condition, or when the viewer number is larger than or equal to a second preset viewer number threshold and no performance degradation message is received, or when the viewer number is larger than or equal to the second preset viewer number threshold, a performance degradation message is received, and the livestream video satisfies the preset trigger condition, determining that the streamer end satisfies the segmentation condition. Optionally, the judging whether the streamer end satisfies the segmentation condition according to the target grade can include: when the target grade is the third grade, determining that the streamer end does not satisfy the segmentation condition.

The viewer number can be the number of viewers who are currently viewing the livestream video. The performance degradation message can be a message sent when a performance detection program in the streamer end detects that the task amount of the processor is too large. The second preset viewer number threshold can be larger than the above first preset viewer number threshold.

When the target grade of the streamer end is a first grade, the viewer number is larger than or equal to a second preset viewer number threshold, and no performance degradation message is received, the streamer end can determine that the segmentation condition is always met, that is, the segmentation capability is always ON. When the target grade is a second grade, or the target grade is the first grade and the viewer number is smaller than a second preset viewer number threshold, or the viewer number is larger than or equal to the second preset viewer number threshold and a performance degradation message is received, and when the livestream video satisfies a preset trigger condition, the streamer end can satisfy the segmentation condition and switch on the segmentation capability. When the target grade of the streamer end is a third grade, it can be determined that the streamer end does not satisfy the segmentation condition, and the segmentation capability is not switched on. The above second preset viewer number threshold can be set according to an actual condition.

In the above solution, the streamer end judges whether itself supports satisfying the segmentation condition before determining the region information of the target object region, and performs segmentation when the segmentation condition is met, which guarantees the follow-up livestream performance to be not influenced and solves a concurrent pressure of the server resulting from large-scale continuous uploading. The judgment of the viewer number of the livestream room can be added for the streamer end with the first grade, which further guarantees the livestream performance and improves the livestream presentation effect.

Step 502, sending the region information to a first client, so that the first client ceases display of second interaction information over the target object region in a livestream page of the livestream video according to the region information.

The second interaction information, for example, target bullet screen comment, is obtained by converting, by the viewer end, a comment content of the livestream video on the basis of a template. The comment content is presented over a first region of a livestream page, the target bullet screen comment is presented in a moving manner, e.g., rolling manner, over a second region of the livestream page, the target object region is located in the second region, and a comment control for the second interaction information, e.g., a bullet screen comment control, is further presented in the livestream page.

Specifically, after determining the region information of the target object region, the streamer end can forward the region information of the target object region to the viewer end through the server, so that the viewer end can hide the target bullet screen comment over the target object region according to the region information while presenting the target bullet screen comment in a rolling manner in the livestream page.

Optionally, after determining that the streamer end does not satisfy the segmentation condition, the comment presentation method further includes: sending a hiding off instruction to the viewer end, so that the viewer end only presents the target bullet screen comment in a rolling manner. The hiding off instruction can be an instruction indicating that the target bullet screen comment in the target object region is not hidden. After it is determined that the segmentation condition is not met, the streamer end can send a hiding off instruction to the viewer end, so that the viewer end only presents the target bullet screen comment in a rolling manner in the livestream page but does not hide the bullet screen comment over the target object region.

Since a performance for the streamer end is highly required for it to follow the livestream to perform region segmentation on the livestream video and provide region information of the target object region for the viewer end, in order to achieve the best display effect and not influence the livestream performance, the embodiment of the present disclosure can dynamically switch on or off the segmentation capability according to the performance information of the streamer end and the number of livestream real-time viewers, and can simultaneously give consideration to the presentation effect and the livestream performance.

According to the livestream comment presentation solution provided by the embodiment of the present disclosure, the streamer end can perform region segmentation on the livestream video being livestreamed, determine the region information of the target object region, and send the region information to the viewer end, so that the viewer end hides the target bullet screen comment over the target object region in the livestream page of the livestream video according to the region information. By adopting the above solution, the streamer end sends the region information of the target object region to the viewer end, so that the target object region will not be obstructed while the viewer end converts the comment content into a bullet screen comment on the basis of the bullet screen comment template and presents the comment content in a rolling manner in form of a bullet screen comment in the picture region of the livestream page. It can not only increase the presentation region of the comment content in the livestream picture and facilitate enhancement of the comment atmosphere, but also can avoid the influence on the livestream viewing of the user and guarantee the livestream viewing experience. Moreover, the bullet screen comment template can be configured in a flexible way, so that the comment content has various styles when presented in form of a bullet screen comment, which strengthens the presentation effect of the comment content, and further improves the livestream experience effect of the user.

Figure 6:
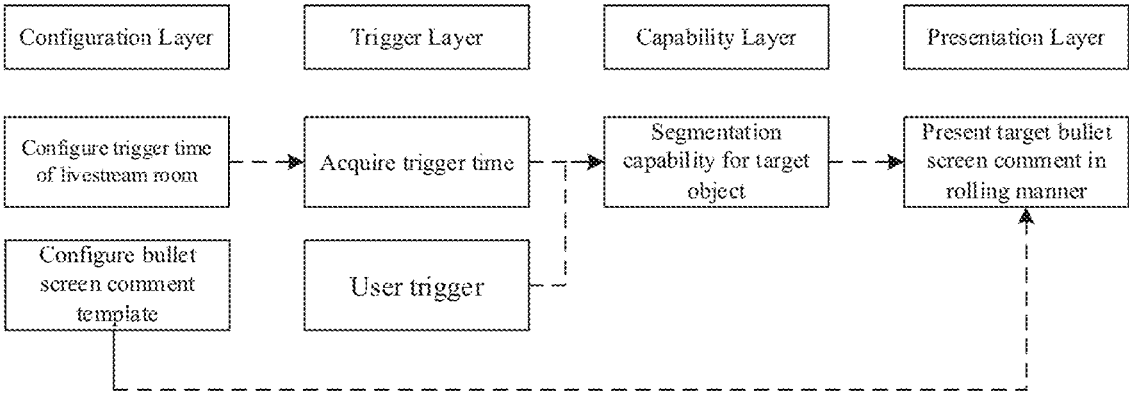
FIG. 6 is a schematic diagram of livestream comment presentation provided by an embodiment of the present disclosure.

Next, the comment presentation method according to the embodiment of the present disclosure is further described by referring to a specific example. Illustratively, FIG. 6 is a schematic diagram of livestream comment presentation provided by an embodiment of the present disclosure. As shown in FIG. 6, the comment presentation method according to the embodiment of the present disclosure is implemented by a configuration layer, a trigger layer, a capability layer, and a presentation layer in the figure, where the configuration layer can be set at a server, the trigger layer and the presentation layer can be set at a viewer end, and the capability layer can be set at the viewer end and a streamer end. The configuration layer can configure a trigger time of a livestream room, namely the above preset time point, and configure a bullet screen comment template and distribute it to the presentation layer; the trigger layer can acquire the trigger time specified by the server and judge whether the trigger time is reached, or the trigger layer can judge whether the user triggers a preset comment key, and send a message to the capability layer if any one of the above is met; the capability layer of the streamer end judges whether it has the segmentation capability for a target object according to performance information of the streamer end, and after it is determined that it has the segmentation capability for the target object, it determines the region information of the target object region and send it to the viewer end, and the capability layer of the viewer end can determine the target object region after receiving the region information of the target object region sent by the streamer end; the presentation layer can present the target bullet screen comment in a rolling manner on the basis of the bullet screen comment template sent by the configuration layer, and hide a part of the bullet screen comment in the target object region as determined according to the capability layer.

Illustratively, in order to enable the target object to be not obstructed when the comment carnival bullet screen comment is presented at a viewing side and to obtain a better presentation effect, the streamer end can perform segmentation on the target object region when the streamer is livestreaming, and provide segmentation information following the live stream for the viewer end for presentation. When there are multiple streamers, that is, in a scenario of multiple persons, the target object region with the largest subject size can be used as the subject for segmentation of the target object. The streamer end can never switch on the segmentation capability for a device with lower performance; switch on the segmentation capability for a device with medium performance when being triggered; follow the following logic for a device with high performance, when the number of online persons in the livestream room exceeds a preset number threshold: 1. when a performance degradation message is received, switch off the segmentation capability, so that the segmentation capability can be switched on only when being triggered; 2. when no performance degradation message is received, always switch on the segmentation capability; when the number of online persons in the room is lower than a preset number threshold, follow the processing logic of the device with medium performance; and remote modification at the server are enabled for the performance and grading configurations.

When the viewer end determines that there is a viewer user who gives a comment carnival card prop in the livestream room, or when a specified time point is reached (the time point is specified by the server) for the livestream room, the viewer end can trigger a comment carnival time, namely, a scenario where the comment content is presented in form of a bullet screen comment. And then, the viewer end can perform a comment carnival preset, alert preset is performed through a preset tray (namely the above preset alert message), wherein each preset tray is presented at least for 2 seconds and at most for 5 seconds, and then switch to a carnival tray for the comment carnival time. When the preset tray is presented, animations can be loaded and played, and when the presetting tray is switched to the carnival tray, interlude animations can be played. The viewer end can present the target bullet screen comment obtained by converting the comment contents in a rolling manner after the comment carnival time, and present a bullet screen comment control to control the displaying and hiding of the target bullet screen comment at the comment carnival time. The time length for displaying the target bullet screen comment is 10 seconds, and after 10 seconds, if there still displays a bullet screen comment on the screen, then it is necessary to wait for completion of the playing of the track thereof. The comment contents of the target bullet screen comments are selected from a source of buffer queue of the public screen.

A bullet screen comment style of the target bullet screen comment can be composed of a profile picture, a comment bonus, a comment font size, a comment color code and a frame cutting (the left portion, the middle portion and the right portion are spliced), and the comment bonus can randomly appear with the probability of 10%-15%. At each comment carnival time, the profile picture, the comment font size and the comment bonus are fixed, but various styles obtained from the comment color code, the frame cutting and the frame probability can be configured, from which a style is randomly selected when display. The frame probability is used for specifying the probability of occurrence of the frame cutting and the comment color code of the style, and the sum of the probabilities of all the styles for each comment carnival time template is 1. The bullet screen comment style enables a flexible configuration at the server. The bullet screen comment track of the target bullet screen comment includes a rotation angle of the bullet screen comment, a screen rolling speed of the bullet screen comment, and a track area, wherein the rotation angle of the target bullet screen comment enables rotation from −90 degrees to +90 degrees, and the screen rolling speed and the track area of the bullet screen comment can be dynamically set.

The bullet screen comment template can define the bullet screen comment style and the bullet screen comment track of the above target bullet screen comment. The configuration is as follows: for each template, a profile picture size, a comment font size, a comment color code, a comment bonus, a frame probability and a frame cutting (the left portion, the middle portion and the right portion are spliced in a 9 patch format) can be configured; for each template, the profile picture size and the comment font size are fixed; for each template, various styles can be configured from the following contents, from which a style can be selected randomly for display at the view end: 1. comment color code: a color value of the font; 2. frame slicing: slicing of the frame which are divided into a left one, a middle one and a right one in a 9 patch format; 3. frame probability: the frame probability is used for specifying, to a client, the probability of the occurrence of the comment color code and the frame slicing, which is between 0-1, and the sum of all the frame probabilities of one template is 1. For the comment bonus, a plurality of comment bonuses can be provided, all of which are slicing. Different bullet screen comment templates can be set for different livestream rooms, and a flexible configuration at a server is enabled.

According to the solution, by presenting a comment of a user in a livestream picture region in form of a bullet screen comment, the comment atmosphere can be enhanced, but displaying a large number of bullet screen comments in the picture is bound to obstruct a main subject portion of a streamer. Therefore, by providing manpower segmentation capability in livestreaming, the bullet screen comments will not obstruct a target object picture region when passing through the target object region of the livestream picture, which increases the display area and the number of the bullet screen comments in the picture region while avoiding the influence on the viewing experience. The solution can also dynamically switch on the segmentation capability for the target object while considering the performance of the streamer end and the presentation effect of the viewing side. The streamer end supports the segmentation capability for the target object by providing a real-time mask following a livestream flow, which requires high performance of the streamer end. In order to achieve the best presentation effect and not influence the performance of livestreaming of the streamer, the solution can dynamically switch on/off the segmentation capability while considering the presentation effect and the livestream performance. This solution can also configure the bullet screen comment style in a flexible way, customize different bullet screen comment templates based on different scenarios such as activity or livestream room, can enable, in a different scenario such as activity or livestream room, the bullet screen comment in the comment region to be presented in a more fit form. Moreover, the server can make flexible adjustment in real time according to service requirements, which strengthens the presentation effect of the bullet screen comment.

Figure 7:
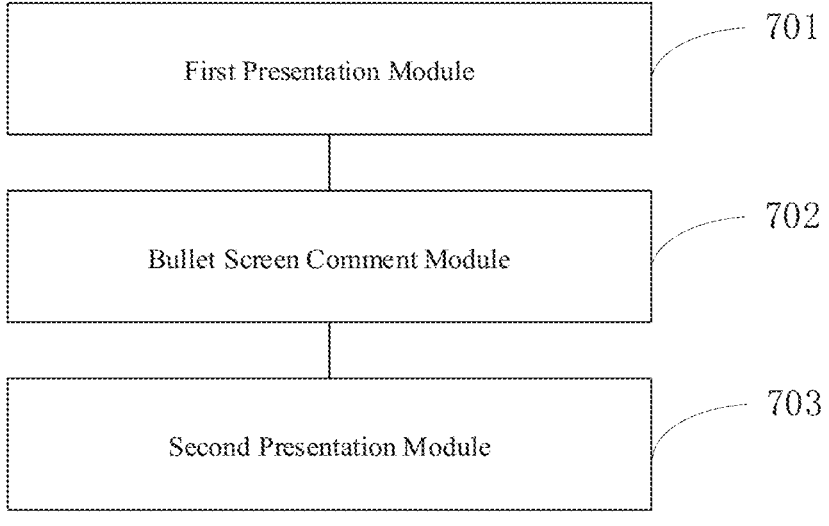
FIG. 7 is a schematic structural diagram of a livestream comment presentation apparatus provided by an embodiment of the present disclosure.

FIG. 7 is a schematic structural diagram of a comment presentation apparatus provided in an embodiment of the present disclosure. The apparatus can be implemented by software and/or hardware, and can be generally integrated into an electronic device. As shown in FIG. 7, the apparatus is set at a viewer end, including:

a first presentation module 701 for playing a livestream video in a livestream page and presenting comment contents of the livestream video in a first region of the livestream page;

a bullet screen comment module 702 for converting, when the livestream video satisfies a preset trigger condition, a target comment content in the comment contents into a target bullet screen comment; and a second presentation module 703 for presenting the target bullet screen comment in a rolling manner in a second region of the livestream page, and presenting a bullet screen comment control.

Optionally, the bullet screen comment module 702 includes a trigger unit, which is used for:

when a streamer of a livestream room corresponding to the livestream video obtains a preset resource, or the livestream video is played to a preset time point, or the viewer number of the livestream room reaches a first preset viewer number threshold, or a trending comment is generated in the livestream room, determining that the livestream video satisfies a preset trigger condition;

wherein, the target comment content is a trending comment in the comment contents, and the trending comment is a comment content with a number of presentations or interactions reaching a preset number threshold.

Optionally, the bullet screen comment module 702 includes a conversion unit, which is used for:

converting a target comment content in the comment contents into a target bullet screen comment on the basis of a pre-acquired bullet screen comment template, which is used for defining a bullet screen comment style and/or a bullet screen comment track of the target bullet screen comment.

Optionally, the second presentation module 703 is specifically used for:

hiding the target bullet screen comment over a target object region in the second region while presenting the target bullet screen comment in a rolling manner in the second region of the livestream page.

Optionally, the apparatus further includes a stop module for:

when a second duration for presentation of the target bullet screen comment in a rolling manner reaches a second preset time length, stopping presentation of the target bullet screen comment.

Optionally, when the region information of the target object region is not acquired or a hiding off instruction sent by a streamer end is received, a start time of the second duration is a time when the region information of the target object region is acquired;

when the region information of the target object region is acquired, the start time of the second duration is the time when the livestream video satisfies the preset trigger condition.

Optionally, the apparatus further includes a preset alert module for, after the livestream video satisfies the preset trigger condition, presenting a preset alert message on the livestream page.

Optionally, the apparatus further includes a control module for:

receiving a trigger operation of a user on the bullet screen comment control, displaying or hiding the target bullet screen comment presented in a rolling manner over the second region, wherein the bullet screen comment control further includes a presentation alert message which is used as an alert of the presentation of the target bullet screen comment.

The livestream comment presentation apparatus provided by the embodiment of the present disclosure can execute the comment presentation method executed by the viewer end as provided by any embodiment of the present disclosure, and has the corresponding functional modules and beneficial effects for executing the method.

Figure 8:
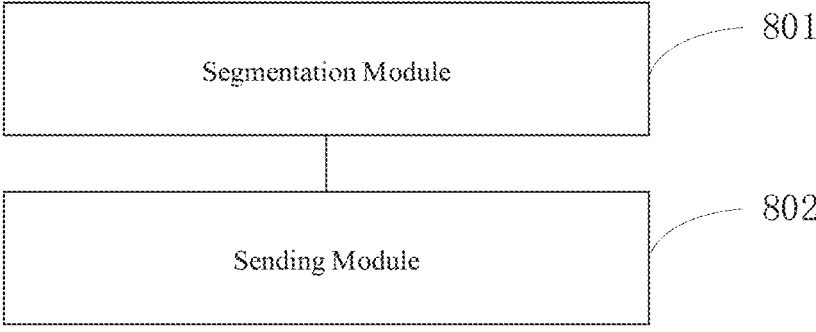
FIG. 8 is a schematic structural diagram of another livestream comment presentation apparatus provided by an embodiment of the present disclosure.

FIG. 8 is a schematic structural diagram of another livestream comment presentation apparatus provided by an embodiment of the present disclosure. The apparatus can be implemented by software and/or hardware, and can be generally integrated into an electronic device. As shown in FIG. 8, the apparatus is applied to a streamer end, including:

a segmentation module 801 for performing region segmentation on a livestream video being livestreamed, and determining region information of a target object region;

a sending module 802 for sending the region information to a viewer end, so that the viewer end hides a target bullet screen comment over the target object region in a livestream page of the livestream video according to the region information;

wherein, the target bullet screen comment is obtained by converting, by the viewer end, a comment content of the livestream video on the basis of a pre-acquired bullet screen comment template; the comment content is presented over a first region of a livestream page; the target bullet screen comment is presented in a rolling manner over a second region of the livestream page; the target object region is located in the second region; and a bullet screen comment control is also presented in the livestream page.

Optionally, the apparatus further includes a judgement module for:

before the performing region segmentation on a livestream video being livestreamed and determining region information of a target object region, judging whether the streamer end satisfies a segmentation condition;

the segmentation module 801 is used for:

when it is determined that the streamer end satisfies the segmentation condition, performing region segmentation on a livestream video being livestreamed and determining region information of a target object region.

Optionally, the judgement module includes:

an acquisition unit for acquiring device grading information from a server;

a grading unit for determining a target grade of the streamer end according to the device grading information and performance information of the streamer end, wherein the device grading information includes correspondence between performance information of a plurality of devices and grades preset by the server;

a condition unit for judging whether the streamer end satisfies the segmentation condition according to the target grade.

Optionally, the condition unit is used for:

when the target grade is a second grade and the livestream video satisfies a preset trigger condition, determining that the streamer end satisfies the segmentation condition.

Optionally, the condition unit is used for:

when the target grade is a first grade, acquiring a viewer number of a livestream room corresponding to the livestream video;

when the viewer number is smaller than a second preset viewer number threshold and the livestream video satisfies a preset trigger condition; or when the viewer number is larger than or equal to a second preset viewer number threshold and no performance degradation message is received; or when the viewer number is larger than or equal to the second preset viewer number threshold, a performance degradation message is received, and the livestream video satisfies a preset trigger condition, determining that the streamer end satisfies the segmentation condition.

Optionally, the condition unit is used for:

when the target grade is a third grade, determining that the streamer end does not satisfy the segmentation condition.

Optionally, the apparatus further includes an instruction module for: after determining that the streamer end does not satisfy the segmentation condition, sending a hiding off instruction to the viewer end, so that the viewer end only presents the target bullet screen comment in a rolling manner.

The livestream comment presentation apparatus provided by the embodiment of the present disclosure can execute the comment presentation method executed by the streamer end provided by any embodiment of the present disclosure, and has the corresponding functional modules and beneficial effects for executing the method.

An embodiment of the present disclosure also provides a computer program product including a computer program/ instructions which, when being executed by a processor, implement the comment presentation method provided in any embodiment of the present disclosure.

An embodiment of the present disclosure also provides a computer program including instructions which, when being executed by a processor, cause the processor to execute the comment presentation method provided in any embodiment of the present disclosure.

Figure 9:
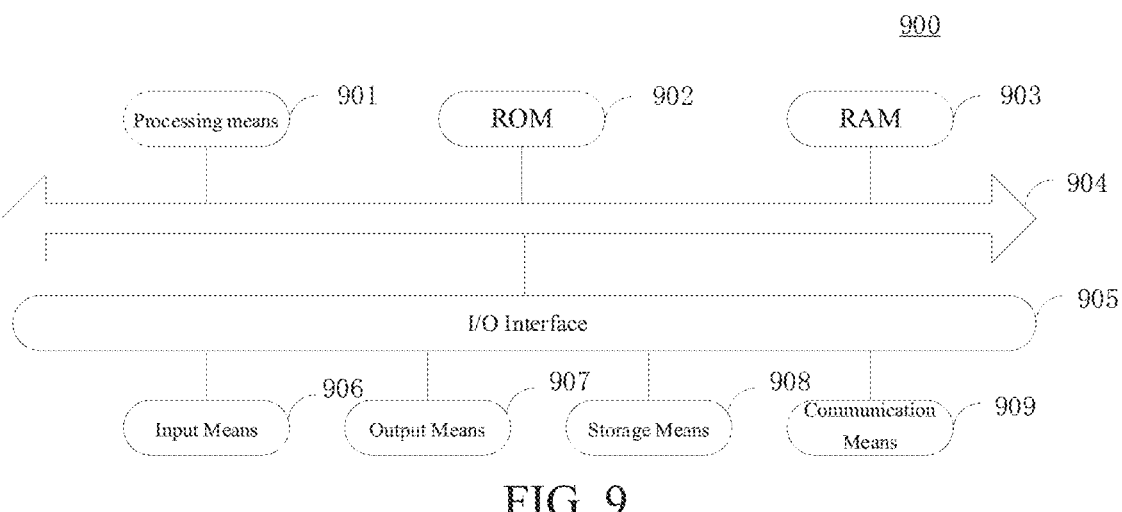
FIG. 9 is a schematic structural diagram of an electronic device provided by an embodiment of the present disclosure.

FIG. 9 is a schematic structural diagram of an electronic device provided by an embodiment of the present disclosure. With specific reference to FIG. 9, a schematic structural diagram of an electronic device 900 adapted for implementing the embodiment of the present disclosure is shown. The electronic device 900 in the embodiment of the present disclosure can include, but is not limited to, a mobile terminal such as a mobile phone, a notebook computer, a digital broadcast receiver, a Personal Digital Assistant (PDA), a tablet computer (PDA), a Portable Media Player (PMP), a vehicle-mounted terminal (e.g., a vehicle navigation terminal), or the like, as well as a fixed terminal such as a Digital TV, a desktop computer, or the like. The electronic device shown in FIG. 9 is only an example, and should not bring any limitation to the functions and scope of use of the embodiment of the present disclosure.

As shown in FIG. 9, the electronic device 900 can include a processing means (e.g., a central processor, a graphics processor, etc.) 901 that can execute various appropriate actions and processes according to a program stored in a Read Only Memory (ROM) 902 or a program loaded from a storage device 908 into a Random Access Memory (RAM) 903. In the RAM 903, various programs and data necessary for the operation of the electronic device 900 are also stored. The processing means 901, the ROM 902, and the RAM 903 are connected to each other via a bus 904. An input/output (I/O) interface 905 is also connected to the bus 904.

Generally, the following means can be connected to the I/O interface 905: an input means 906 including, for example, a touch screen, a touch pad, a keyboard, a mouse, a camera, a microphone, an accelerometer, a gyroscope, or the like; an output device 907 including, for example, a Liquid Crystal Display (LCD), a speaker, a vibrator, or the like; a storage means 908 including, for example, a magnetic tape, a hard disk, or the like; and a communication means 909. The communication means 909 can allow the electronic device 900 to perform wireless or wired communication with other device so as to exchange data. While FIG. 9 illustrates an electronic device 900 having various means, it should be understood that not all illustrated means are required to be implemented or provided. More or fewer means can be alternatively implemented or provided.

In particular, the process described above with reference to the flowcharts can be implemented as a computer software program, according to the embodiments of the present disclosure. For example, the embodiment of the present disclosure includes a computer program product comprising a computer program carried on a non-transitory computer readable medium, the computer program containing program code for executing the method shown by the flowchart. In such an embodiment, the computer program can be downloaded and installed from a network through the communication means 909, or installed from the storage means 908, or installed from the ROM 902. When executed by the processing means 901, the computer program executes the above functions defined in the comment presentation method of the embodiment of the present disclosure.

It should be noted that the above computer readable medium of the present disclosure can be a computer readable signal medium or a computer readable storage medium or any combination of both the above. The computer readable storage medium can be, for example, but not limited to, an electronic, magnetic, optical, electromagnetic, infrared, or semiconductor system, apparatus, or device, or any combination of the above. More specific examples of the computer readable storage medium can include, but are not limited to: an electrical connection having one or more wires, a portable computer diskette, a hard disk, a Random Access Memory (RAM), a Read-Only Memory (ROM), an Erasable Programmable Read-Only Memory (EPROM or flash memory), an optical fiber, a portable Compact Disc Read-Only Memory (CD-ROM), an optical storage device, a magnetic storage device, or any suitable combination of the above. In the present disclosure, the computer readable storage medium can be any tangible medium that contains or stores a program for use by or in connection with an instruction execution system, apparatus, or device. In contrast, in the present disclosure, the computer readable signal medium can include a propagated data signal with computer readable program code carried therein, for example, in baseband or as part of a carrier wave. Such a propagated data signal can take any of a variety of forms, including, but not limited to, an electro-magnetic signal, an optical signal, or any suitable combination of the above. The computer readable signal medium can also be any computer readable medium other than the computer readable storage medium, and can communicate, propagate, or transport a program for use by or in connection with an instruction execution system, apparatus, or device. Program code contained on the computer readable medium can be transported using any appropriate medium, including but not limited to: electrical wires, optical cables, RF (radio frequency), etc., or any suitable combination of the above.

In some implementations, clients and servers can communicate using any currently known or future developed network Protocol, such as the HyperText Transfer Protocol (HTTP), and can be interconnected with any form or medium of digital data communication (e.g., a communication network). Examples of the communication network include a Local Area Network ("LAN"), a Wide Area Network ("WAN"), an Internet (e.g., the Internet), and a peer-to-peer network (e.g., an ad hoc peer-to-peer network), and any currently known or future developed network.

The above computer readable medium can be contained in the electronic device; or can be separate and not incorporated into the electronic device.

The above computer readable medium carries one or more programs which, when being executed by the electronic device, cause the electronic device to: play a livestream video in a livestream page and present a comment content of the livestream video in a first region of the livestream page; when the livestream video satisfies a preset trigger condition, convert a target comment content in the comment contents into a target bullet screen comment; and present the target bullet screen comment in a rolling manner in a second region of the livestream page, and present a bullet screen comment control.

Alternatively, the above computer readable medium carries one or more programs which, when being executed by the electronic device, cause the electronic device to: perform region segmentation on a livestream video being livestreamed, and determine region information of a target object region; send the region information to the viewer end so that the viewer end hides a target bullet screen comment over a target object region in a livestream page of the livestream video according to the region information; wherein, the target bullet screen comment is obtained by converting, by the viewer end, a comment content of the livestream video on the basis of a pre-acquired bullet screen comment template, the comment content is presented over a first region of a livestream page, the target bullet screen comment is presented in a rolling manner over a second region of the livestream page, the target object region is located in the second region, and a bullet screen comment control is also presented in the livestream page.

Computer program code for executing operations of the present disclosure can be written in one or more programming languages or a combination thereof. The above programming language includes, but is not limited to, an object oriented programming language such as Java, Smalltalk, C++, as well as a conventional procedural programming language such as the "C" programming language or similar programming languages. The program code can be executed entirely on a user computer, partly on the user computer, as a stand-alone software package, partly on the user computer and partly on a remote computer, or entirely on the remote computer or a server. In a scenario where the remote computer is involved, the remote computer can be connected to the user computer through any type of network, including a Local Area Network (LAN) or a Wide Area Network (WAN), or connected to an external computer (for example, connected through the Internet using an Internet service provider).

The flowcharts and block diagrams in the figures illustrate the architecture, functionalities, and operations of possible implementations of the system, method and computer program product according to various embodiments of the present disclosure. In this regard, each block in the flowcharts or block diagrams can represent a module, program segment, or part of code, which contains one or more executable instructions for implementing the specified logical function(s). It should also be noted that, in some alternative implementations, the functions labeled in the blocks can also occur out of the order labeled in the figures. For example, two blocks shown in succession can, in fact, be executed substantially concurrently, or they can sometimes be executed in the reverse order, depending upon the functionalities involved. It will also be noted that each or a combination of blocks in the block diagrams and/or flowcharts can be implemented by a special purpose hardware-based system for executing the specified functions or operations, or implemented by a combination of special purpose hardware and computer instructions.

The involved units described in the embodiments of the present disclosure can be implemented by means of software or hardware. The names of the units do not in some cases constitute a limitation on the units themselves.

The functions described herein above can be executed, at least in part, by one or more hardware logic components. For example, without limitation, exemplary types of hardware logic components that can be used include: Field Programmable Gate Arrays (FPGAs), Application Specific Integrated Circuits (ASICs), Application Specific Standard Products (ASSPs), System on Chips (SOCs), Complex Programmable Logic Devices (CPLDs), and the like.

In the context of the present disclosure, a machine readable medium can be a tangible medium that can contain or store a program for use by or in connection with an instruction execution system, apparatus, or device. The machine readable medium can be a machine readable signal medium or a machine readable storage medium. The machine readable medium can include, but is not limited to, an electronic, magnetic, optical, electromagnetic, infrared, or semiconductor system, apparatus, or device, or any suitable combination of the above. More specific examples of a machine readable storage medium would include an electrical connection based on one or more wires, a portable computer diskette, a hard disk, a Random Access Memory (RAM), a Read-Only Memory (ROM), an Erasable Programmable Read-Only Memory (EPROM or flash memory), an optical fiber, a portable Compact Disc Read-Only Memory (CD-ROM), an optical storage device, a magnetic storage device, or any suitable combination of the above.

The above description is only illustrations of the preferred embodiments of the present disclosure and the principles of the technology employed. It should be understood by those skilled in the art that the disclosure scope involved in the present disclosure is not limited to the technical solution formed by a particular combination of the above technical features, but also encompasses other technical solution formed by any combination of the above technical features or equivalents thereof, without departing from the spirit of the present disclosure. For example, a technical solution formed by a mutual replacement of the above features and the technical features having similar functions as disclosed in (but not limited to) the present disclosure.

Further, while various operations are depicted in a particular order, this should not be understood as requiring that these operations be executed in the particular order shown or in a sequential order. Under certain circumstances, multitasking and parallel processing are possibly advantageous. Likewise, while several specific implementation details are contained in the above discussion, these should not be construed as limitations on the scope of the present disclosure. Certain features that are described in the context of a separate embodiment can also be implemented in combination in a single embodiment. Conversely, various features that are described in the context of a single embodiment can also be implemented in multiple embodiments separately or in any suitable subcombination.

Although the subject matter has been described in a language specific to structural features and/or methodological acts, it should be understood that the subject matter defined in the appended Claims is not necessarily limited to the specific features or acts described above. Rather, the specific features and acts described above are only exemplary forms for implementing the Claims.

What is claimed is:

1. A comment presentation method, which is applied to a first client, comprising:

playing a livestream video in a livestream page and presenting first interaction information of the livestream video in a first region of the livestream page;

in response to satisfying a preset trigger condition, converting one or more pieces of interaction information included in the first interaction information into second interaction information;

presenting the second interaction information in a moving manner in a second region of the livestream page; and in response to a second duration for presentation of the second interaction information reaching a second preset time length, stopping presentation of the second interaction information, wherein, in response to region information of a first object region in the second region being not acquired at a time the second interaction information starts to be presented in the moving manner in the second region of the livestream page, a start time of the second duration is a time at which the region information of the first object region is acquired; or in response to the region information of the first object region being acquired at the time the second interaction information starts to be presented in the moving manner in the second region of the livestream page, the start time of the second duration is a time at which the preset trigger condition is satisfied.

2. The method according to claim 1, wherein the first interaction information is first dynamic comments that move in a first direction, and the second interaction information is second dynamic comments that move in a second direction that is different from the first direction, wherein satisfying the preset trigger condition comprises:

in response to a streamer of a livestream room corresponding to the livestream video obtaining a preset resource, or the livestream video being played to a preset time point, or a viewer number of the livestream room reaching a first preset viewer number threshold, or a trending comment being generated for the livestream video, determining that the preset trigger condition is satisfied.

3. The method according to claim 2, wherein, presenting the second interaction information in the moving manner in the second region of the livestream page comprises:

ceasing display of the second interaction information over the first object region in the second region at the same time of presenting the second interaction information in the moving manner in the second region of the livestream page.

4. The method according to claim 3, wherein, the method further comprises:

receiving a trigger operation of a user on a comment control, displaying or ceasing display of the second interaction information presented in the moving manner over the second region, wherein the comment control further comprises a presentation alert message which is configured as an alert of the presentation of the second interaction information.

5. The method according to claim 1, wherein, the one or more pieces of interaction information are trending comments, and the trending comments are comments with a number of presentations or interactions reaching a preset number threshold.

6. The method according to claim 1, wherein, converting the one or more pieces of interaction information in the first interaction information into the second interaction information comprises:

converting the one or more pieces of interaction information in the first interaction information into the second interaction information on the basis of a pre-acquired template which is configured for defining at least one of a style or a track of the second interaction information, and the method further comprises presenting a comment control for the second interaction information.

7. The method according to claim 1, wherein, the start time of the second duration is a start time of ceasing display of the second interaction information over the first object region in the second region at the same time of presenting the second interaction information in the moving manner in the second region of the livestream page.

8. The method according to claim 1, wherein, after satisfying the preset trigger condition, the method further comprises:

presenting an alert message on the livestream page.

9. A non-transitory computer readable storage medium storing a computer program, which when executed by a processor, causes the processor to perform the comment presentation method according to claim 1.

10. A comment presentation method, which is applied to a second client, comprising:

judging whether the second client satisfies a segmentation condition;

in response to determining that the second client satisfies the segmentation condition, performing region segmentation on a livestream video of livestreaming and determining region information of a first object region for the livestreaming; and sending the region information to a first client, so that the first client ceases display of second interaction information over the first object region in a livestream page of the livestream video according to the region information;

wherein first interaction information is presented in a first region of the livestream page, the second interaction information is presented in a moving manner in a second region of the livestream page, the first object region is located in the second region.

11. The method according to claim 10, wherein the first interaction information is first dynamic comments that move in a first direction, and the second interaction information is second dynamic comments that move in a second direction that is different from the first direction.

12. The method according to claim 11, wherein, judging whether the second client satisfies the segmentation condition comprises:

receiving device grading information;

determining a grade of the second client according to the device grading information and performance information of the second client, wherein the device grading information comprises preset correspondence between performance information of a plurality of devices and grades; and judging whether the second client satisfies the segmentation condition according to the grade of the second client.

13. The method according to claim 12, wherein, the judging whether the second client satisfies the segmentation condition according to the grade of the second client comprises:

in response to the grade of the second client being a second grade and the livestream video satisfying a preset trigger condition, determining that the second client satisfies the segmentation condition;

in response to the grade of the second client being a third grade, determining that the second client does not satisfy the segmentation condition.

14. The method according to claim 12, wherein, judging whether the second client satisfies the segmentation condition according to the grade of the second client comprises:

in response to the grade of the second client being a first grade, acquiring a viewer number of a livestream room corresponding to the livestream video;

in response to the viewer number being smaller than a second preset viewer number threshold and the livestream video satisfying a preset trigger condition; or in response to the viewer number being larger than or equal to the second preset viewer number threshold and no performance degradation message being received; or in response to the viewer number being larger than or equal to the second preset viewer number threshold, a performance degradation message being received, and the livestream video satisfying the preset trigger condition, determining that the second client satisfies the segmentation condition.

15. An electronic device, the electronic device comprising:

a processor; and a memory for storing instructions executable by the processor;

wherein the processor is configured for reading the executable instructions from the memory and executing the executable instructions to implement the comment presentation method according to claim 10.

16. A non-transitory computer readable storage medium storing a computer program, which when executed by a processor, causes the processor to perform the comment presentation method according to claim 10.

17. An electronic device, the electronic device comprising:

a processor; and a memory for storing instructions executable by the processor;

wherein the processor is configured for reading the executable instructions from the memory and executing the executable instructions to implement a comment presentation method comprising:

playing a livestream video in a livestream page and presenting first interaction information of the livestream video in a first region of the livestream page;

in response to satisfying a preset trigger condition, converting one or more pieces of interaction information included in the first interaction information into second interaction information;

presenting the second interaction information in a moving manner in a second region of the livestream page; and in response to a second duration for presentation of the second interaction information reaching a second preset time length, stopping presentation of the second interaction information, wherein, in response to region information of a first object region in the second region being not acquired at a time the second interaction information starts to be presented in the moving manner in the second region of the livestream page, a start time of the second duration is a time at which the region information of the first object region is acquired; or in response to the region information of the first object region being acquired at the time the second interaction information starts to be presented in the moving manner in the second region of the livestream page, the start time of the second duration is a time at which the preset trigger condition is satisfied.

* * * * *